United States Patent [19]

Sani et al.

[11] Patent Number: 5,195,403

[45] Date of Patent: Mar. 23, 1993

[54] COMPOSITE CUTTING INSERT

[75] Inventors: Mohammad N. Sani, Woodley; Graeme D. Dufferwiel, Reading, both of England

[73] Assignee: De Beers Industrial Diamon Division Limited, Transvaal, South Africa

[21] Appl. No.: 843,447

[22] Filed: Feb. 28, 1992

[30] Foreign Application Priority Data

Mar. 1, 1991 [GB] United Kingdom ............... 9104366

[51] Int. Cl.$^5$ .................. B23B 51/02; B23C 5/16
[52] U.S. Cl. ..................... 76/108.6; 76/DIG. 11; 76/DIG. 12; 408/144; 408/145; 175/428
[58] Field of Search ............. 76/108.1, 108.6, 108.2, 76/DIG. 12, DIG. 11, 101.1; 408/144, 145, 227; 51/307, 308, 309, 293; 175/426, 428

[56] References Cited

U.S. PATENT DOCUMENTS

| | | | |
|---|---|---|---|
| 4,160,616 | 7/1979 | Winblad | 408/144 |
| 4,688,652 | 8/1987 | Crist | 76/108.2 |
| 4,762,445 | 8/1988 | Bunting et al. | 408/144 |
| 4,991,467 | 2/1991 | Packer | 76/DIG. 12 |

FOREIGN PATENT DOCUMENTS 0177213 10/1983 Japan ........................ 408/144
2085769 5/1982 United Kingdom ........... 408/144

*Primary Examiner*—Roscoe V. Parker
*Attorney, Agent, or Firm*—Scully, Scott, Murphy & Presser

[57] ABSTRACT

A method of producing a composite cutting insert for a twist drill includes the steps of cutting an intermediate blank from a composite diamond compact. The intermediate blank comprises a relatively broad tungsten carbide strip with a relatively narrow polycrystalline diamond strip at one edge. First and second cutting insert halves are cut from the intermediate blank, each cutting insert half defining a cutting edge of the diamond material. The cutting insert halves are arranged back-to-back to form a composite cutting insert, with the cutting edges on opposite sides of a central plane. The cutting edges are arranged to define a chevron shaped composite cutting edge. The cutting insert halves are preferably brazed together to form a unitary cutting insert. The invention extends to a method of producing a twist drill including the steps of forming a slot-shaped seat diametrally in the end of a twist drill body, and brazing the composite cutting insert into the seat.

15 Claims, 1 Drawing Sheet

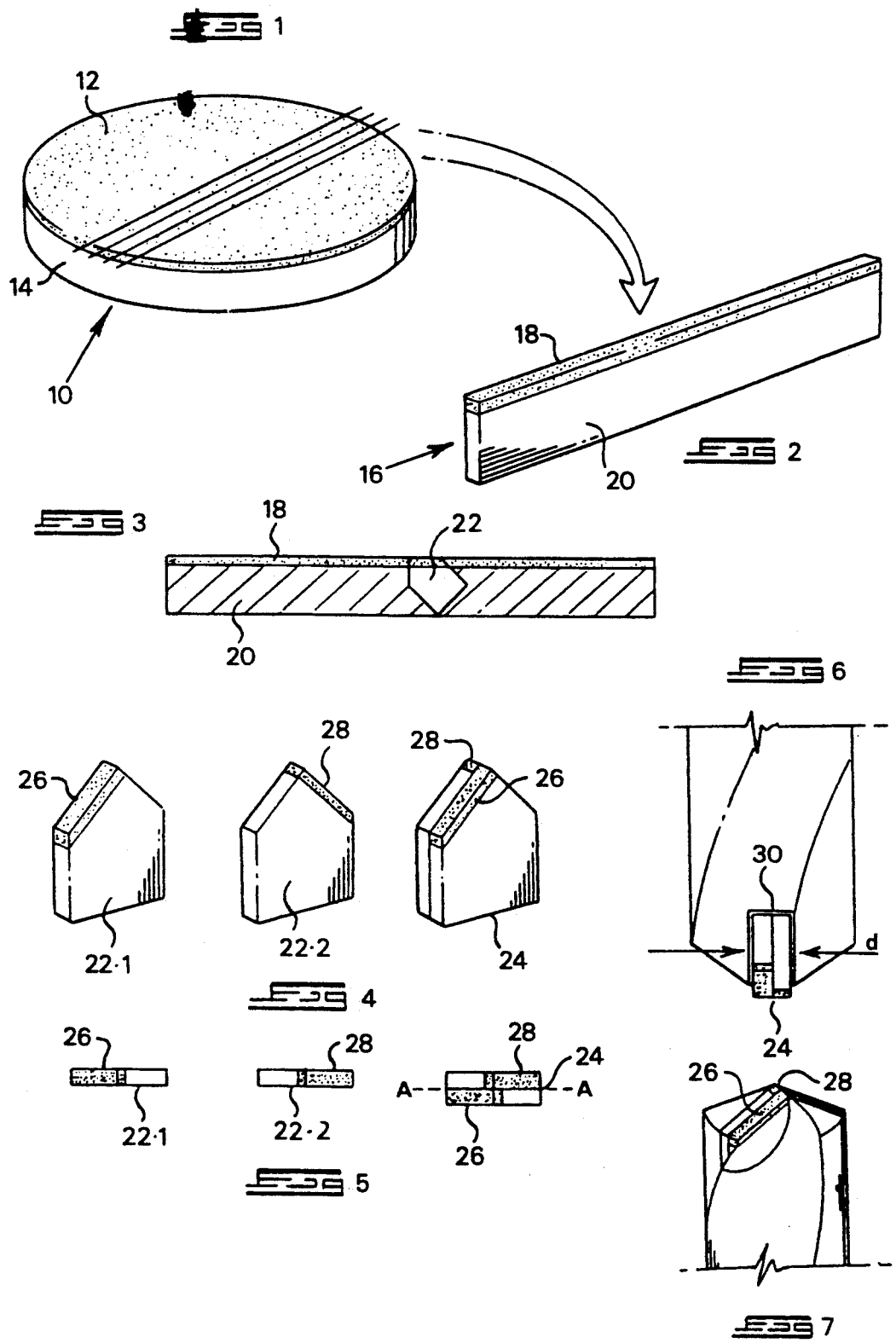

COMPOSITE CUTTING INSERT

BACKGROUND OF THE INVENTION

This invention relates to a method of producing a composite cutting insert and a twist drill incorporating the insert, and to a cutting insert and a twist drill formed by the method.

Twist drills cutting inserts formed from polycrystalline diamond (PCD) composite compacts are known in various forms. One known twist drill of this type incorporates a cutting insert which is generally wedge- or chevron-shaped, which comprises a central layer of polycrystalline diamond with a thin tungsten carbide layer on each side thereof. The cutting insert is fitted into a diametral slot in the end of the twist drill body so that the tip of the wedge or chevron is aligned with the central axis of the drill. The resulting twist drill resembles a conventional masonry drill, but has respective chisel edges defined by the diamond material of the insert.

The above described cutting inserts have a number of drawbacks. Firstly, the sandwich-type double-skinned PCD material, with dual tungsten carbide layers, is relatively expensive. The sandwich material also suffers from a relatively high level of internal stresses, which may require the use of carbide as a matching material in the drill body. This considerably increases the cost of the finished twist drill. Also, inserts of this kind are prone to breakage, particularly with drills of longer than 100 to 125 mm.

SUMMARY OF THE INVENTION

According to the invention a method of producing a composite cutting insert includes the steps of:
  forming first and second cutting insert halves from a composite diamond compact blank, each cutting insert half defining a cutting edge of diamond material; and
  arranging the cutting insert halves back-to-back to form a composite cutting insert, so that the respective cutting edges lie on opposite sides of a central plane of the composite insert.

Preferably the method includes the step of bonding the two cutting insert halves together to form a unitary composite cutting insert.

The cutting insert halves may be formed with a rectangular cross section, so that the composite cutting insert has a rectangular cross section and is adapted for insertion into a diametral slot-shaped seat in the end of a twist drill.

Preferably the respective cutting edges of the cutting insert halves are arranged to define a chevron-shaped composite cutting edge.

The method may include the steps of cutting a strip from a composite diamond compact disc to form an intermediate blank having a strip of diamond material at one edge thereof, and cutting the cutting insert halves from the intermediate blank so that the cutting edge of each cutting insert half is formed from a portion of the diamond strip.

Further according to the invention a method of producing a twist drill includes the steps of providing a composite cutting insert formed by the above method, and fixing the composite cutting insert into a seat formed diametrally in the end of a twist drill body.

The cutting insert may be a unitary insert, or may comprise separate halves which are simultaneously bonded together and fixed into the seat by brazing.

Preferably, the geometry of the twist drill flute and tip is restored by grinding after the composite cutting insert has been fixed into the seat.

The invention extends to a composite cutting insert and a twist drill produced by the above methods.

BRIEF DESCRIPTION OF THE DRAWINGS

FIG. 1 is a pictorial view of a polycrystalline diamond compact disc of a conventional type;

FIG. 2 shows a single elongate blank cut from the disc of FIG. 1;

FIG. 3 shows how a cutting insert half according to the invention is cut from the blank of FIG. 2;

FIG. 4 shows a pair of the cutting insert halves singly, and bonded together to form a composite insert;

FIG. 5 shows top views of the insert halves and the composite insert of FIG. 4;

FIG. 6 is a side view of an assembled twist drill with a composite cutting insert according to the invention; and FIG. 7 is a pictorial view of the finished twist drill, after a grinding operation.

DESCRIPTION OF AN EMBODIMENT

FIG. 1 illustrates a composite diamond compact disc 10 which comprises a layer of polycrystalline diamond 12 on a tungsten carbide backing layer 14. Composite diamond compacts of this kind are well known and are available, for example, under the trade mark SYNDITE.

As a first step in the method of the invention, the disc 10 shown in FIG. 1 is cut into a number of thin elongate strip-shaped intermediate blanks 16, as shown in FIG. 2. Each intermediate blank 16 has a narrow strip 18 of diamond material at one edge, with a broader portion 20 of the tungsten carbide backing material adjacent thereto.

FIG. 3 shows how the intermediate blank 16 is cut to produce a cutting insert half 22 which has a wedge or chevron-shaped end, one side of which coincides with the edge strip 18 of the PCD material. A pair of the cutting insert halves are shown in FIG. 4, marked 22.1 and 22.2. The halves are reversed relative to one another and assembled back to back to form a composite cutting insert 24. The two halves 22.1 and 22.2 of the composite cutting insert are brazed together. The composite insert 24 has a chevron-shaped composite cutting edge comprising a first edge 26 of the cutting insert half 22.1, and a second edge 28 of the second cutting insert half 22.2. FIG. 5 illustrates the cutting insert halves and the composite cutting insert of FIG. 4 in plan, showing the arrangement of the cutting edges 26 and 28, which can be seen to lie on opposite sides of a central plane A—A of the composite cutting insert. Each cutting insert half has a narrow rectangular cross-sectional shape, and the composite cutting insert is also rectangular in cross section.

FIG. 6 is a side view of the tip of a twist drill, showing a slot-shaped diametral seat 30 which is cut into the end of the twist drill by electric discharge machining (EDM). The width d of the seat is equal to double the width of a single cutting insert half, added to three times the width of the brazing foil which is used to bond the cutting insert halves together and to bond the composite cutting insert into the seat itself. Once the composite cutting insert has been fixed by brazing into the seat 30, the original geometry of the twist drill is restored by grinding, to restore the tip and flute geometry. In this regard, it is advantageous that any grinding of the composite insert in the flute region of the drill will encounter only a small thickness (typically 0.7 mm) of PCD material, whereas in the case of a conventional double-skinned PCD insert, a much larger area of PCD material must be ground. The amount of diamond material which must be ground is less than 50% (typically much less than 50%) of the amount of tungsten carbide backing material which must be ground.

FIG. 7 illustrates pictorially the end portion of the final twist drill, showing how the cutting edges 26 and 28 overlap to form the chisel edge of the finished twist drill. It is also apparent from FIG. 7 that only a small amount of diamond material has been removed from each side of the composite cutting insert in restoring the flute geometry of the twist drill.

Although it is convenient to form a unitary composite cutting insert by brazing the two cutting insert halves together, it is also possible to assemble the halves in the seat of the twist drill and to braze them together at the same time as brazing them into position in the seat.

The method of the invention allows composite cutting inserts of the kind described to be manufactured relatively cheaply, since conventional PCD compacts are employed, rather than special double-skinned compacts. The amount of diamond material used in each insert is also relatively small. Additionally, the cutting inserts of the present invention can be fitted to conventional steel twist drill blanks, further lowering the costs of the final product.

Prior cutting inserts using "sandwich" materials, with a layer of PCD material between two layers of tungsten carbide, tend to be highly stressed in use and are inclined to crack if the shank of the twist drill is longer than about 100-125 mm. The cutting inserts of the present invention are much less highly stressed and are not subject to the same drill length limitation. In addition, the method of the present invention permits the use of conventional two-layer composite compacts, instead of more expensive three-layer "sandwich" compacts.

We claim:

1. A method of producing a composite cutting insert including the steps of:
    forming first and second cutting insert halves from a composite diamond compact blank, each cutting insert half defining a cutting edge of diamond material; and
    arranging the cutting insert halves back-to-back to form a composite cutting insert, so that the respective cutting edges lie on opposite sides of a central plane of the composite insert.

2. A method according to claim 1 including the step of bonding the two cutting insert halves together to form a unitary composite cutting insert.

3. A method according to claim 2 wherein the cutting insert halves are brazed together to form the unitary composite cutting insert.

4. A method according to claim 1 wherein the cutting insert halves are formed with a rectangular cross section, so that the composite cutting insert has a rectangular cross section and is adapted for insertion into a diametral slot-shaped seat in the end of a twist drill.

5. A method according to claim 1 wherein the respective cutting edges of the cutting insert halves are arranged to define a chevron-shaped composite cutting edge.

6. A method according to claim 1 wherein the method includes the steps of cutting a strip from a composite diamond compact disc to form an intermediate blank having a strip of diamond material at one edge thereof, and cutting the cutting insert halves from the intermediate blank so that the cutting edge of each cutting insert half is formed from a portion of the diamond strip.

7. A method according to claim 6 wherein the intermediate blank comprises a relatively broad tungsten carbide strip with a relatively narrow polycrystalline diamond strip at one edge thereof.

8. A method according to claim 1 wherein the respective cutting edges of the cutting insert halves are arranged so that they overlap in a zone defining the chisel edge of the finished twist drill.

9. A composite cutting insert formed by the method of claim 1.

10. A method of producing a twist drill including the steps of:
    providing a composite cutting insert according to claim 9; and
    fixing the composite cutting insert into a seat formed diametrally in the end of a twist drill body.

11. A method according to claim 10 wherein the composite cutting insert is a unitary insert which is fixed into the seat by brazing.

12. A method according to claim 11 wherein the composite cutting insert comprises two cutting insert halves which are simultaneously bonded together and fixed into the seat by brazing.

13. A method according to claim 10 wherein the geometry of the twist drill flute and tip is restored by grinding after the composite cutting insert has been fixed into the seat.

14. A method according to claim 13 wherein less than 50% of the portion of the insert which is ground comprises diamond.

15. A twist drill formed by the method of claim 10.

* * * * *